United States Patent [19]

Minchak

[11] 4,138,448
[45] Feb. 6, 1979

[54] PROCESS FOR PREPARING POLYMERS OF CYCLOPENTADIENE AND BICYCLOHEPTENE MIXTURES

[75] Inventor: Robert J. Minchak, Parma Heights, Ohio

[73] Assignee: The B. F. Goodrich Company, New York, N.Y.

[21] Appl. No.: 857,547

[22] Filed: Dec. 5, 1977

[51] Int. Cl.² .......................... C08F 4/60; C08F 4/44; C08F 232/08; C08F 297/06
[52] U.S. Cl. .................................. 260/879; 526/114; 526/137; 526/153; 526/169; 526/281; 526/283
[58] Field of Search ............... 526/114, 153, 281, 283, 526/137, 169, 879

[56] References Cited

U.S. PATENT DOCUMENTS

| | | | |
|---|---|---|---|
| 3,498,961 | 3/1970 | Tazuma | 526/169 |
| 3,687,921 | 8/1972 | Oberkirch et al. | 526/169 |
| 3,917,747 | 11/1975 | Matsumura et al. | 260/879 |
| 3,941,757 | 3/1976 | Wakabayashi et al. | 260/279 |
| 3,959,234 | 5/1976 | Kurasawa et al. | 526/169 |
| 4,002,815 | 1/1977 | Minchak | 526/283 |
| 4,039,491 | 8/1977 | Ikeda et al. | 260/879 |

FOREIGN PATENT DOCUMENTS 1957025  5/1971  Fed. Rep. of Germany ........... 526/281

*Primary Examiner*—Herbert J. Lilling
*Attorney, Agent, or Firm*—Maky, Renner, Otto & Boisselle

[57] ABSTRACT

A process for preparing polymers of a monomer mixture of cyclopentadiene and at least one bicycloheptene is described, and the process comprises polymerizing the monomer mixture in the presence of a catalyst mixture comprising
  (a) at least one organoaluminum halide of the formula $$RAlX_2 \text{ or } R_3Al_2X_3$$

wherein R is an alkyl radical containing from 1 to about 12 carbon atoms, and X is a halogen, and
  (b) at least one tungsten or molybdenum salt, or a mixture of these salts.

The polymers obtained in this manner exhibit plastic properties such as high impact strength, and can be oil extended and used as general purpose rubbers.

20 Claims, No Drawings

PROCESS FOR PREPARING POLYMERS OF CYCLOPENTADIENE AND BICYCLOHEPTENE MIXTURES

BACKGROUND OF THE INVENTION

Cycloolefins can be polymerized through the olefin structure to yield polycycloaliphatics, or through a ring-opening process to yield unsaturated linear polymers and copolymers. The latter process has particular appeal since the resulting polymers are sulphur-vulcanizable. Since cyclopentene is a readily available ethylene production by-product, considerable art has focussed on the ring-opening polymerization and copolymerization of cyclopentene. Recent patents and publications have disclosed a number of catalyst systems and polymerization processes for producing desirable polymers and copolymers of cycloolefins. Examples of patents describing catalysts and catalyst combinations as well as processes for polymerizing cycloolefins include U.S. Pat. Nos. 4,002,815; 3,853,830; 3,597,403; and 3,778,420.

A number of the catalyst systems which have been suggested in the prior art for preparing polymers of cyclomonoolefins such as tungsten or molybdenum halides in conjunction with organoaluminum compounds provide linear polymers having a high proportion of gel. More recently, other catalyst systems have been discovered which produce linear polymers of cyclic monoolefins which essentially are gel-free. For example, in U.S. Pat. No. 4,025,708, a solvent is used for the tungsten compound in the catalyst system allowing for improved process control and substantially gel-free cyclopentene homopolymers and copolymers.

Dicyclopentadiene (a norbornene-type monomer) is another readily available ethylene production by-product, but not as much consideration has been given in the prior art to homopolymers and copolymers of dicyclopentadiene. It has been observed that the application of the broad prior art teachings to the preparation of homopolymers and copolymers of dicyclopentadiene generally results in the production of a polymer which is substantially insoluble in hydrocarbon solvents including aliphatic, cycloaliphatic and aromatic hydrocarbons. U.S. Pat. Nos. 3,853,830 and 4,002,815, describe processes for preparing substantially gel-free copolymers of dicyclopentadiene with cyclopentene utilizing a catalyst which comprises (a) at least one compound selected from the group consisting of dialkylaluminum iodides, alkylaluminum diiodides and mixtures of trialkylaluminum compounds with elemental iodine and (b) at least one solvent-soluble or monomer-soluble tungsten compound, and (2) at least one nonconjugated acyclicolefin having at least one hydrogen on each double-bonded carbon atom. Soluble copolymers are obtained when component (a) is charged before catalyst component (b).

SUMMARY OF THE INVENTION

The present invention relates to a process for preparing polymers of a monomer mixture of cyclopentadiene and from about five to about 95% by weight, based on the total polymer weight, of at least one bicycloheptene. The invention also relates to the copolymers prepared which are copolymers of cyclopentadiene and from about five to about 95% by weight of at least one bicycloheptene. The process comprises polymerizing the monomer mixture in the presence of a catalyst mixture which comprises (a) at least one organoaluminum halide of the formula $RAlX_2$ or $R_3Al_2X_3$ wherein R is an alkyl radical containing from 1 to about 12 carbon atoms, and X is a halogen, and (b) at least one tungsten or molybdenum salt, or a mixture of these salts.

The improved process of this invention provides copolymers which contain reduced amounts of gel. The copolymer compositions of the invention exhibit plastic properties and can be oil extended and exhibit excellent green strength and can be vulcanized readily to high tensile strength rubbers.

DESCRIPTION OF THE PREFERRED EMBODIMENTS

The copolymer compositions of the invention are prepared in accordance with the process of this invention wherein the monomer mixture is polymerized in the presence of a catalyst mixture comprising at least one organoaluminum halide and at least one tungsten or molybdenum salt. Preferably, the monomer mixture is dissolved in a hydrocarbon solvent which more preferably is an aromatic hydrocarbon solvent.

The hydrocarbon solvents useful for the polymerization include aliphatic or cycloaliphatic hydrocarbon solvents containing from about 4 to 10 carbon atoms such as pentane, hexane, heptane, octane, cyclohexane and cyclooctane. Substituted hydrocarbons wherein the substituents are inert, such as dichloromethane and chloroform may be used. However, as mentioned above, the aromatic hydrocarbon solvents are preferred, and examples of such solvents include the aromatic hydrocarbons containing 6 to about 14 carbon atoms and which are liquid or easily liquified at reaction temperatures such as benzene, toluene, xylene and naphthalene. The solvent may be added to the reaction vessel prior to the addition of either or both of the monomers, or after the two monomers are charged to the reaction vessel, but in any event, the solvent should be charged to the vessel prior to the addition of the catalysts.

The bicycloheptene monomer utilized in the method of the invention has a general formula

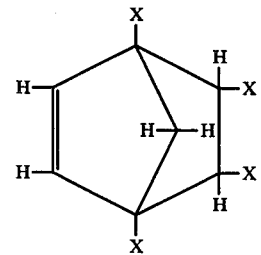

wherein each X may be hydrogen or an alkyl or alkenyl group containing from one to about 20 carbon atoms, and more preferably from about one to about five carbon atoms. Examples of readily available bicycloheptenes include hydrogenated dicyclopentadiene, the norbornene type compounds such as 2-norbornene (bicyclo[2.2.1]-2-heptene), 5-methyl-2-norbornene, 5,6-dimethyl-2-norbornene, 5-ethyl-2-norbornene, 5-butyl-2-norbornene, 5-vinyl-2-norbornene, 5-propenyl-2-norbornene, 5-butenyl-2-norbornene and compounds having the formula

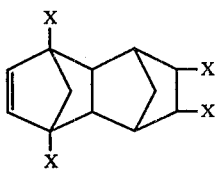

wherein X is hydrogen or an alkyl group containing from one to about 20 carbon atoms and preferably from one to about three carbon atoms. Mixtures of two or more of the above described bicycloheptenes can be copolymerized with cyclopentadiene in accordance with the process of the invention.

The polymerization is conducted in the presence of a catalyst mixture which comprises (a) at least one organoaluminum halide and (b) at least one tungsten or molybdenum salt or a mixture of these salts. The organoaluminum halide which is utilized in a catalyst mixture can be either a dihalide of the formula $RAlX_2$ or aluminum sesquihalides of the formula $R_3Al_2X_3$ wherein R is an alkyl radical containing from one to about 12 carbon atoms and more preferably from about two to about four carbon atoms, and X is a halogen. Specific examples of such organoaluminum halides include ethylaluminum dichloride, ethylaluminum diiodide, propylaluminum dichloride, propylaluminum diiodide, isobutylaluminum dichloride, ethylaluminum dibromide, ethylaluminum sesquichloride, methylaluminum sesquichloride, methylaluminum sesquibromide, etc.

The tungsten and/or molybdenum salts useful in the catalyst mixture can be salts of inorganic or organic acids, and are preferably salts of inorganic acids. The halides are particularly effective, and examples of suitable tungsten halides include $WCl_6$, $WBr_6$, $WI_6$, $WF_6$, $WOCl_4$, $WO_2Cl_2$, $WCl_5$, $WBr_5$, $WO_2Br_2$, $WCl_4$ and $WCl_2$. Examples of halides of molybdenum compounds include $MoCl_5$, $MoCl_6$, $MoBr_5$, $MoBr_6$, $MoI_5$, $MoI_6$, $MoF_5$, $MoF_6$ and $MoF_5Cl$.

Other representative salts of tungsten and molybdenum include those of acetyl acetonates, sulfates, phosphates, nitrates, phenolates, benzoates, etc. Specific examples of these salts include compounds such as molybdenum acetylacetonate, molybdenum sulfate and tungsten phenoxate. Mixtures of one or more of any of the above mentioned tungsten salts with one or more of the molybdenum salts also can be employed in the process of the invention. The more preferred salts are the halides especially molybdenum pentachloride and tungsten hexachloride.

The organoaluminum halides or a mixture of organoaluminum halides is employed at a level of from about 0.01 to about 20 or more millimoles per mole of monomer, and the molybdenum or tungsten salts are employed at a level of from about 0.001 to about 1.0 millimoles per mole of monomer mixture. The molar ratio of organoaluminum halide to molybdenum and/or tungsten salt(s) is not critical and may range from about 200:1 or more to about 1:10 although a ratio within the range of from 4:1 to about 2:1 is preferred.

In another preferred embodiment, the organoaluminum halide and the salts of tungsten and molybdenum are dissolved in a solvent prior to incorporation into the monomer mixture. The addition of the catalyst components as solutions facilitates the handling thereof and also results in a brief induction period after addition to the monomer mixture which permits the addition of all of the components of the reaction mixture before substantial polymerization begins. The result is a more uniform process control, and ultimately, reduced gel formation. Generally, the organoaluminum halide will be predissolved in the same hydrocarbon solvent as used for conducting a polymerization reaction. Thus, preferred solvents for the organoaluminum halides are the aromatic solvents such as benzene, toluene, etc.

The preferred solvent for the molybdenum and tungsten compounds comprise at least one alkylester of a saturated carboxylic or dicarboxylic acid. The ester solvent can contain from two to about 20 carbon atoms which may be substituted with up to three halogen atoms. The ester solvent which should be a liquid under the prevailing reaction conditions in order to maintain the tungsten and molybdenum compounds in solution during the reaction preferably contain from two to about ten carbon atoms. The concentration of the salts in the ester solvents may vary from about 0.1 molar. Examples of the preferred ester solvents include methyl formate, ethyl formate, methyl chloroformate, ethyl chloroformate, methyl acetate, ethyl acetate, n-propyl acetate, ethyl propionate and dimethyl malonate. Excellent results are obtained with ethyl acetate.

The process of the invention appears to be subjected to several variations such as the following. The monomer mixture may be dissolved in a solvent contained in a reaction vessel followed by the addition of the catalyst components in any order. Alternative charging procedures are permissible with this reaction system as a result of the difference in the reactivity of the monomers. Cyclopentadiene can be polymerized with the organoaluminum halides but the bicycloheptenes require the presence of the tungsten or molybdenum salts before polymerization occurs. Therefore, it is possible to charge the reaction vessel with both the cyclopentadiene and the bicycloheptene monomers and to add the organoaluminum halide to the vessel to polymerize the cyclopentadiene. Upon addition of the tungsten or molybdenum salt to the reaction mixture containing partially polymerized cyclopentadiene, the bicycloheptene then polymerizes or copolymerizes with the cyclopentadiene. When this procedure is followed, an intimate polymer blend is obtained which exhibits one phase on an electron micrograph. Alternatively, the bicycloheptene can be charged first to the reaction mixture and polymerized using a mixture of an organoaluminum halide and a tungsten or molybdenum salt followed by the addition of cyclopentadiene which then polymerizes or copolymerizes with the bicycloheptene.

A polymerization activator may be used but is not generally required. Examples of activators include water, methanol, ethanol, ispropyl alcohol, benzyl alcohol, phenol, ethyl mercaptan, 2-chloroethanol, epichlorohydrin, ethylene oxide, cyclopentene-2-hydroperoxide, cumyl hydroperoxide, tertiary butyl perpoxide, benzoyl peroxide, and air or oxygen. Excellent activation is obtained by using air or a peroxide or hydroperoxide, and especially by using the organic peroxide such as benzoyl peroxide. The activator may be added at any point in the charging procedure, but is more preferably added last.

The molecular weight of the copolymers prepared in accordance with the process of the invention can be controlled or modified when the reaction is conducted in the presence of at least one non-conjugated acyclic olefin containing from two to about 12 carbon atoms and having at least one hydrogen on each doube-bonded carbon atom. Examples of suitable compounds include the 1-olefins such as 1-butene, 3-methyl-1-butene, 1-hexene; the 2-olefins such as 2-pentene, 4-methyl-2-pentene; 3-olefins such as 5-ethyl-3-octene; non-conjugated diolefins such as 1,6-hexadiene; and non-conjugated triolefins such as 1,4-octatriene. The preferred non-conjugated acyclic olefins are the 1-olefins of the type described above.

The non-conjugated acyclic olfins or a mixture of such olefins is used in a molar ratio of olefin to total monomer charge of from about 0.0001:1 to about 0.3:1. The non-conjugated acyclic olefin can be charged directly or in solution at any point in the charging procedure, but it is preferred that the olefin be charged along with the monomers.

The polymerization reaction can be performed as a batch or continuous process. The reaction mixture in the reactor vessel may be cooled or heated to the polymerization temperature at the start of the additions or at any point during the addition of the various reactants. Polymerization temperatures of from about −80° C. to about 100° C. are utilized although the reaction generally proceeds satisfactorily at about room temperature.

If desired, the polymerization reaction can be shortstopped by the addition of alcohols, amines or carboxylic acids such as ethanol, t-butyl phenol, diethylamine, acetic acid, etc.

At the conclusion of the polymerization reaction, the copolymer product may be isolated by any of the methods known in the art such as by direct drying under reduced pressure, by precipitation or by steam or by hot water stripping. The polymer is recovered and may be washed further and then dried. The copolymers of the invention are substantially gel-free, and generally are plastic or glass like at room temperature. When extended with an oil, the copolymers behave as elastomers.

The following examples illustrate the methods for preparing the copolymer compositions of the invention. It should be understood that the Examples are set forth for illustrative and not restrictive purposes. Unless otherwise indicated, all parts and percentages are by weight.

EXAMPLES 1-6

Cyclopentadiene is copolymerized with norbornene using the following procedure and glass reactor vessels. Cyclopentadiene and the norbornene are mixed with benzene and added to the reactor vessel. The 1-butene is added as a two volume percent solution in benzene. The ethyl aluminum sesquichloride is added as a 0.5 molar solution in benzene followed by the addition of the tungsten hexachloride (0.20 molar in ethyl acetate or 0.05 molar in benzene). The reactions are conducted at about 25° C. unless otherwise indicated with stirring and produce little heat. The copolymerization reactions proceed to completion in a short time and produce viscous smooth polymers. In some instances, additional ingredients are as indicated in the Table. The reactions are shortstopped by the addition of an alcohol such as ethanol. The grams and moles of reactants (in order of addition), yield of polymer, and other properties are set forth in Table. I. The dilute solution viscosity (DSV) is measured at a concentration of 0.1 gram in 100 ml. of toluene at 25° C.

TABLE I

| Example | 1 | 2 | 3 | 4 | 5[1] | 6[1] |
|---|---|---|---|---|---|---|
| Benzene (gms) | 32.4 | 32.4 | 36.1 | 32.6 | 364 | 369 |
| CPD (gms) | 4.1 | 3.9 | 1.7 | 1.6 | 41 | 41 |
| Norbornene (gms) | 0.8 | 0.8 | 0.8 | 0.8 | 4.2 | 8.9 |
| 1-Butene (ml) | 0.004 | 0.008 | 0.004 | 0.004 | — | — |
| Et$_3$Al$_2$Cl$_3$ (mM) | 0.1 | 0.1 | 0.1 | 0.1 | 0.1 | 0.15 |
| W Cl$_6$ (mM) | 0.005 | 0.005 | 0.010 | 0.010 | 0.025 | 0.025 |
| Et$_3$Al$_2$Cl$_3$ (mM) | — | — | 0.05 | — | — | — |
| 1-butene (ml) | — | 0.008 | — | 0.016 | — | — |
| Reaction time (min.) | 20 | 22 | 14 | 21 | 118 | 135 |
| Polymer wt. (gms.) | 3.7 | 3.6 | 1.5 | 1.5 | 35.5 | 36.5 |
| DSV | 0.9 | 0.89 | 1.32 | 1.89 | 1.26 | 1.05 |
| % gel | 13 | 16 | 0 | 8.2 | 15.1[2] | 14.9[2] |

[1]Reaction at 0° C.
[2]Volatile matter or solvent retained. Later found to be essentially 0% gel

COMPARISON EXAMPLES

In the following examples A, B and C, variations were made in the above procedure to illustrate the effect of the variations on properties of the products obtained as compared to the product obtained in Example 1. In Example A, the procedure of Example 1 is followed except that the norbornene is omitted from the reaction mixture along with the tungsten hexachloride which is a catalyst for the norbornene polymerization. In Example B, the cyclopentadiene is omitted from the reaction mixture whereas in Example C, the tungsten hexachloride is omitted. As can be seen from the results of these examples which are summarized below in Table IA, the copolymer prepared in accordance with the procedure of Example 1 provides the product having the lowest dilute solution viscosity.

TABLE IA

| Example | 1 | A* | B | C |
|---|---|---|---|---|
| Benzene (gms) | 32.4 | 34.4 | 33.2 | 32.8 |
| CPD (gms) | 4.1 | 3.9 | — | 4.0 |
| Norbornene (gms) | 0.8 | — | 0.85 | 0.9 |
| 1-Butene (ml) | 0.004 | 0.005 | 0.004 | 0.004 |
| Et$_3$Al$_2$Cl$_3$ (mM) | 0.1 | 0.1 | 0.1 | 0.1 |
| W Cl$_6$ (mM) | 0.005 | — | 0.005 | — |
| Polymer Wt. (gms) | 3.7 | 3.5 | 0.52 | 4.0 |
| DSV | 0.9 | 1.6 | 2.9 | 2.0 |
| % gel | 13 | 12 | 16 | 20 |

*Reaction at −25° C

EXAMPLE 7

The procedure of Example 1 is repeated except that the tungsten hexachloride is replaced by an equivalent amount of molybdenum pentachloride.

EXAMPLE 8

The procedure of Example 1 is repeated except that ethylaluminum dichloride is used as the aluminum halide catalyst.

EXAMPLE 9

The procedure of Example 3 is repeated except that diethylaluminum iodide is used as the aluminum halide catalyst.

EXAMPLE 10

The procedure of Example 3 is repeated except that the norbornene is replaced by an equivalent amount of 5-methyl norbornene.

EXAMPLES 11-12

These examples illustrate a modification of the process of preparing the polymer compositions of the invention wherein the cyclopentadiene is the last ingredient added to the reaction vessel and is added a few minutes after the polymerization of the norbornene is initiated. The grams and moles of reactants (in order of addition), and the yields and properties of the products are summarized below in Table II.

TABLE II

| Example | 11 | 12 |
|---|---|---|
| Benzene (gms) | 35.8 | 34.0 |
| Norbornene (gms) | 0.8 | 0.9 |
| Butene-1 (ml) | 0.004 | 0.002 |
| $Et_3Al_2Cl_3$ (mM) | 0.1 | 0.1 |
| $W Cl_6$ (mM) | 0.005 | 0.005 |
| CPD (gms) | 1.65 | 4.0[2] |
| Reaction time (min.) | 11 | 14 |
| Polymer Wt. (gms) | 2.0 | 2.65 |
| DSV | 1.47 | 1.88 |
| % gel | 3 | 5 |

[1]Added after 3 minutes of reaction time
[2]Added after 11 minutes of reaction time

EXAMPLE 13

The procedure of Example 11 is repeated except that the norbornene is replaced by an equivalent amount of dicyclopentadiene.

EXAMPLE 14

The procedure of Example 11 is repeated except that cyclopentadiene is first included in the reaction mixture and norbornene is added to the reaction mixture about five minutes after the polymerization of the cyclopentadiene is initiated.

EXAMPLE 15

This example illustrates another sequence for mixing and reacting the monomers. Cyclopentadiene (0.85 grams) is dissolved in 32.9 grams of benzene, and 1.2 ml. of a 2% solution of 1-butene in benzene is added along with 0.1 millimoles of ethyl aluminum sesquichloride. After 16 minutes of stirring at about room temperature, 2.5 grams of norbornene is added to the clear solution along with 0.005 millmole of tungsten hexachloride dissolved in ethyl acetate.

The reaction is shortstopped with ethanol after two minutes. A polymer yield of 0.9 grams is obtained which is characterized as having a DSV of 2.37 which contains about 6.3% gel.

As mentioned above, the copolymers prepared in accordance with the invention can be oil extended and mixed with carbon black to give vulcanizates which have excellent properties. They can be employed along as tire tread or carcass stock or blended with other rubbers or plastics. They can be used to improve the tack and green strength of rubbers such as butadiene/styrene emulsion copolymers, cis-polybutadiene and other solution-polymerized conjugated diene polymers. The polymers of the invention also can be used in cement and adhesive formulations. In the above applications, the copolymers of the invention can be compounded and cured with conventional fillers, extenders, plasticizers, antioxidants, cure accelerators, cross linking or curing agents, pigments and stabilizers.

The embodiments of the invention in which an exclusive property or privilege is claimed are defined as follows:

1. A process for preparing polymers of a monomer mixture of cyclopentadiene and from about 5 to about 95% by weight, based on total polymer weight, of at least one bicycloheptene comprising polymerizing the monomer mixture in the presence of a catalyst mixture comprising
   (a) at least one organoaluminum halide of the formula $RAlX_2$ or $R_3Al_2X_3$ wherein R is an alkyl radical containing from 1 to about 12 carbon atoms, and X is a halogen, and
   (b) at least one tungsten or molybdenum salt, or a mixture of these salts.

2. The process of claim 1 wherein the catalyst mixture comprising a mixture of an alkylaluminum sesquihalide and a tungsten salt.

3. The process of claim 1 wherein the catalyst mixture comprises a mixture of an alkylaluminum sesquihalide and a molybdenum salt.

4. The process of claim 1 wherein X is chlorine or iodine.

5. The process of claim 2 wherein the sesquihalide is ethylaluminum sesquichloride.

6. The process of claim 1 wherein the monomer mixture and catalysts are dissolved in a solvent.

7. The process of claim 6 wherein the solvent for the monomer mixture is benzene.

8. The process of claim 2 wherein the tungsten salt is a tungsten halide.

9. The process of claim 8 wherein the tungsten halide is tungsten hexachloride.

10. The process of claim 3 wherein the molybdenum salt is molybdenum pentachloride.

11. The process of claim 1 wherein the bicycloheptene is a norbornene or dicyclopentadiene.

12. The process for preparing copolymers of cyclopentadiene and at least one bicycloheptene comprising the steps of:
   (a) preparing a charge comprising cyclopentadiene and a catalyst comprising (i) a tungsten salt, a molybdenum salt or mixture thereof or (ii) an organoaluminum halide of the formula $RAlX_2$ or $R_3Al_2X_3$ wherein R is an alkyl radical containing from 1 to 12 carbon atoms and X is a halogen, or (iii) a mixture of (i) and (ii),
   (b) partially polymerizing the cyclopentadiene,
   (c) adding at least one bicycloheptene and catalyst (i) or (ii) when said catalyst is not included in the charge prepared in step (a) to the partially polymerized cyclopentadiene obtained in (b), and
   (d) copolymerizing the bicycloheptene with the partially polymerized cyclopentadiene to form the desired copolymer.

13. The process of claim 12 wherein both an organoaluminum halide and a salt are included in a charge prepared in step (a) and no catalyst is added with the bicycloheptene in step (c).

14. The process of claim 12 wherein an organoaluminum halide is incorporated into the charge prepared in step (a) and a molybdenum salt or tungsten salt is added with the bicycloheptene in step (c).

15. A process for preparing copolymers of cyclopentadiene and at least bicycloheptene which comprises the steps of
   (a) preparing a charge comprising at least one bicycloheptene, at least one tungsten or molybdenum salt, and at least one organoaluminum halide of the formula $RAlX_2$ or $R_3Al_2X_3$ wherein R is an alkyl radical containing from 1 to 12 carbon atoms and X is a halogen,
   (b) partially polymerizing said charge,
   (c) adding cyclopentadiene to the partially polymerized charge, and (d) completing the polymerization reaction to form the desired copolymer.

16. The process of claim 15 wherein the organoaluminum compound is ethylaluminum sesquihalide, and the molybdenum compound is molybdenum pentachloride.

17. The process of claim 15 wherein the bicycloheptene is a norbornene.

18. The process of claim 15 wherein the bicycloheptene is dicyclopentadiene.

19. The process of claim 15 wherein the amount of cyclopentadiene added to the charge is from about 5 to about 95% by weight, based upon the total polymer weight.

20. The polymer prepared in accordance with the process of claim 1.